(12) United States Patent
Huang et al.

(10) Patent No.: US 8,850,569 B1
(45) Date of Patent: Sep. 30, 2014

(54) INSTANT MESSAGING MALWARE PROTECTION

(75) Inventors: Chih-Jung Huang, Taipei (TW);
Shun-Fa Yang, Taipei (TW);
Cheng-Jyun Lai, Yonghe (TW);
Wei-Chin Chen, Xindian (TW); Kevin Chien-Yu Chen, Tainan (TW)

(73) Assignee: Trend Micro, Inc., Tokyo (JP)

( * ) Notice: Subject to any disclaimer, the term of this patent is extended or adjusted under 35 U.S.C. 154(b) by 917 days.

(21) Appl. No.: 12/103,124

(22) Filed: Apr. 15, 2008

(51) Int. Cl.
*G06F 11/00* (2006.01)
*G06F 21/56* (2013.01)
*H04L 29/06* (2006.01)

(52) U.S. Cl.
CPC ............... *G06F 11/00* (2013.01); *G06F 21/56* (2013.01); *H04L 63/145* (2013.01); *H04L 63/1416* (2013.01)
USPC .......................................................... 726/22

(58) Field of Classification Search
CPC ....... G06F 11/00; G06F 21/56; H04L 63/145; H04L 63/1416
USPC .......................................................... 726/22
See application file for complete search history.

(56) References Cited

U.S. PATENT DOCUMENTS

| | | | |
|---|---|---|---|
| 6,826,707 B1* | 11/2004 | Stevens | 714/2 |
| 6,978,303 B1* | 12/2005 | McCreesh et al. | 709/224 |
| 7,450,567 B1* | 11/2008 | Mamnani | 370/352 |
| 7,490,350 B1* | 2/2009 | Murotake et al. | 726/11 |
| 7,594,050 B2* | 9/2009 | Tysowski | 710/67 |
| 7,600,258 B2* | 10/2009 | Desouza et al. | 726/24 |
| 7,735,116 B1* | 6/2010 | Gauvin | 726/2 |
| 7,752,317 B1* | 7/2010 | Cox et al. | 709/229 |
| 7,779,243 B2* | 8/2010 | Adrangi et al. | 713/2 |
| 7,779,469 B2* | 8/2010 | Hopen et al. | 726/22 |
| 7,788,692 B2* | 8/2010 | Rambo | 725/51 |
| 7,823,200 B2* | 10/2010 | Desouza et al. | 726/22 |
| 7,941,562 B2* | 5/2011 | Cheng et al. | 709/246 |
| 8,181,036 B1* | 5/2012 | Nachenberg | 713/189 |
| 2004/0128356 A1* | 7/2004 | Bernstein et al. | 709/206 |
| 2005/0021773 A1* | 1/2005 | Shiga et al. | 709/228 |

(Continued)

OTHER PUBLICATIONS

Harley et al., "AVIEN Malware Defense Guide", 2007.*

(Continued)

*Primary Examiner* — Ondrej Vostal
(74) *Attorney, Agent, or Firm* — Beyer Law Group LLP

(57) ABSTRACT

A computing device capable of instant messaging (IM) contains IM anti-malware software for preventing the transmission of malware-created IMs and opening potentially harmful IMs that it receives. When transmitting an IM, the software checks to ensure that the message being sent was created by the user (a human being) and not by IM malware, such as an IM BOT. This is done by copying details of a message as it is being typed by a user into a database and searching for that data before an IM is transmitted from the device. The software also ensures that when it receives an IM from an outside source, that the message contains a special encrypted signal that was inserted into the message by the source when the source has determined that the message was created by a human being. If the special signal is not found, it is presumed that the message was created by malware and may be discarded. Ensuring that an IM message is created by a human being is by leveraging a feature in IM client software that provides the name of the person typing the message as the message is being created.

19 Claims, 11 Drawing Sheets

(56) References Cited

U.S. PATENT DOCUMENTS

| | | | |
|---|---|---|---|
| 2005/0060276 A1* | 3/2005 | Nielsen et al. | 707/1 |
| 2005/0132009 A1* | 6/2005 | Solie | 709/206 |
| 2005/0132070 A1* | 6/2005 | Redlich et al. | 709/228 |
| 2005/0229250 A1* | 10/2005 | Ring et al. | 726/23 |
| 2006/0068755 A1* | 3/2006 | Shraim et al. | 455/410 |
| 2006/0123346 A1* | 6/2006 | Totman et al. | 715/748 |
| 2006/0143157 A1* | 6/2006 | Landsman | 707/2 |
| 2006/0168539 A1* | 7/2006 | Hawkins et al. | 715/780 |
| 2006/0212518 A1* | 9/2006 | Bailey et al. | 709/205 |
| 2006/0227971 A1* | 10/2006 | Haddad | 380/247 |
| 2006/0248575 A1* | 11/2006 | Levow et al. | 726/1 |
| 2006/0251084 A1* | 11/2006 | Elliot | 370/398 |
| 2006/0288420 A1* | 12/2006 | Mantripragada et al. | 726/25 |
| 2007/0006308 A1* | 1/2007 | Desouza et al. | 726/24 |
| 2007/0022296 A1* | 1/2007 | Caverly et al. | 713/178 |
| 2007/0079113 A1* | 4/2007 | Kulkarni et al. | 713/150 |
| 2007/0113293 A1* | 5/2007 | Blumenau | 726/27 |
| 2007/0136812 A1* | 6/2007 | Qiu | 726/24 |
| 2007/0180509 A1* | 8/2007 | Swartz et al. | 726/9 |
| 2007/0211673 A1* | 9/2007 | Anantha | 370/338 |
| 2007/0226510 A1* | 9/2007 | Iglesia et al. | 713/177 |
| 2007/0240222 A1* | 10/2007 | Tuvell et al. | 726/24 |
| 2007/0244974 A1* | 10/2007 | Chasin | 709/206 |
| 2008/0056487 A1* | 3/2008 | Akyol et al. | 380/2 |
| 2008/0066180 A1* | 3/2008 | Repasi et al. | 726/24 |
| 2008/0074384 A1* | 3/2008 | Orr et al. | 345/156 |
| 2008/0077995 A1* | 3/2008 | Curnyn | 726/27 |
| 2008/0127293 A1* | 5/2008 | Cohen et al. | 726/1 |
| 2008/0134175 A1* | 6/2008 | Fitzgerald et al. | 718/1 |
| 2008/0155696 A1* | 6/2008 | Dudley et al. | 726/24 |
| 2008/0172741 A1* | 7/2008 | Reumann et al. | 726/23 |
| 2008/0177994 A1* | 7/2008 | Mayer | 713/2 |
| 2008/0189788 A1* | 8/2008 | Bahl | 726/25 |
| 2008/0196099 A1* | 8/2008 | Shastri | 726/12 |
| 2008/0199040 A1* | 8/2008 | Jonsson et al. | 382/100 |
| 2008/0207233 A1* | 8/2008 | Waytena et al. | 455/466 |
| 2008/0229414 A1* | 9/2008 | Hudis et al. | 726/22 |
| 2008/0233983 A1* | 9/2008 | Park et al. | 455/466 |
| 2008/0263157 A1* | 10/2008 | Bhogal et al. | 709/206 |
| 2008/0294726 A1* | 11/2008 | Sidman | 709/206 |
| 2009/0013405 A1* | 1/2009 | Schipka | 726/22 |
| 2009/0037509 A1* | 2/2009 | Parekh et al. | 709/201 |
| 2009/0044013 A1* | 2/2009 | Zhu et al. | 713/170 |
| 2009/0049132 A1* | 2/2009 | Livne Gutovski | 709/206 |
| 2009/0049527 A1* | 2/2009 | Romeo et al. | 726/4 |
| 2009/0064335 A1* | 3/2009 | Sinn et al. | 726/24 |
| 2009/0077616 A1* | 3/2009 | Lindholm et al. | 726/1 |
| 2009/0158430 A1* | 6/2009 | Borders | 726/23 |
| 2009/0198691 A1* | 8/2009 | Kraft et al. | 707/6 |
| 2009/0241167 A1* | 9/2009 | Moore | 726/1 |
| 2010/0043072 A1* | 2/2010 | Rothwell | 726/24 |
| 2010/0153376 A1* | 6/2010 | Davidson | 707/723 |
| 2010/0154032 A1* | 6/2010 | Ollmann | 726/3 |

OTHER PUBLICATIONS

Friedman et al., "Protecting data on mobile devices: A taxonomy of security threats to mobile computing and review of applicable defenses", 2008.*

Naedele et al., "Industrial information system security part 1", 2005.*

Haukli, "Analyzing Malicious code: Dynamic Techniques", 2007.*

Brandle et al., "Srictly no admittance", 2008, pp. 71-80.*

Owen, "The State of Malware".*

Stinson et al., Characterizing Bots' Remote Control Behavior, 2007.*

Hale et al., "Secur(e/ity) Management: A Continuing Uphill Climb", 2007.*

Askola et al., "Vulnerability dependencies in antivirus software", 2008.*

Sun et al., "Practical Proactive Integrity Preservation: A Basis for Malware Defense", 2008.*

Owen, "The State of Malware", 2007.*

* cited by examiner

INSTANT MESSAGING MALWARE PROTECTION

BACKGROUND OF THE INVENTION

1. Field of the Invention

The present invention relates to computer network security. More specifically, it relates to software and devices for preventing instant messaging malware from sending harmful instant messages over a network.

2. Description of the Related Art

Over the past several years, a technology for communicating over the Internet and other networks known as instant messaging has been adopted by enterprises, businesses, and individuals at a rapid pace and is still growing. Instant messaging ("IM") is enabled by a program, sometimes referred to as an "IM client," that allows two or more people to communicate with one another over the Internet in real time. Although most IM communications occur as text, some IM programs also offer streaming audio-visual conferencing and file exchange services. The term "instant messaging" may refer to messages sent by instant messaging, or to the act of sending an instant message.

Companies in nearly all sectors of business are adopting IM at a record pace to improve their information sharing abilities and to decrease the time needed to make business decisions. But the rapid adoption of IM networks by corporate users makes instant messaging a viable vehicle for malicious threats. Real-time communication solutions like IM often create a new attack vector for threats to enter an enterprise network.

Internal enterprise networks (e.g., Intranets, VPNs, etc.) and public IM networks (e.g., those implemented by AOL, Yahoo, MSN Hotmail, GMail, etc.) have all been targets of IM malware, including IM worms and IM BOTS. These threats are fast to propagate and mutate, making them an attractive option for malware authors. As a result, enterprises and the public networks will increasingly require a management tool to control real-time communication and keep IM available, compliant, and secure.

A common form of attack involves a BOT (an automated program that performs or simulates human actions on a computing device and the Internet that may be used to take control of computers, launch attacks, and compromise data) on a computer that uses the IM client on the device to send IMs containing harmful URLs and other content to contacts in the user's address book. It does this by stealing the user name and password of the instant messenger program, login as if it were the user and sends out either malicious URL links or files. These contacts get the IM, see that it is from a known person, open the IM and click on the URL or open attachments, and thereby spread the malware and compromising data on their devices. The contacts receiving the IM may not be able to discern that the IM was created by a BOT on the known person's computer and not by the actual person. While many users have become educated over the years about the dangers of opening e-mails and attachments that they are not sure about, this level of caution has not yet been embedded in the IM user community.

SUMMARY OF THE INVENTION

In one embodiment, a method of preventing the transmission of a potentially harmful instant message created by malware on a PC, mobile phone, or other IP and IM-enabled device involves detecting that an IM is being created in an IM window on the device. As the text of the message is being typed by the user (a human being), the text may be copied or replicated in an IM detail database on the device. In one embodiment, the text of the message or at least a portion thereof is copied character by character into the database. In one embodiment, the database is relational and the format of a record, which may be referred to as an operation detail record, includes a field for the message text. Other fields of an operation detail record may include the sender's name, recipient name(s), metadata on attachments, the type of instant message, and other data. Once the user (sender) is done typing the message and attaching files, and hits SEND, the operation detail record may be completed or sealed and saved in the IM detail database immediately. In one embodiment, the operation detail record may include a timestamp stating the exact time and day that the message was sent (i.e., when the user hit SEND or equivalent). Thus, at this stage the database contains a record corresponding to the IM created by the user who opened an IM window to create and send the message. A message created by malware on the device, such as an IM BOT, will not have been created using an IM window and therefore would not have a corresponding operation detail record in the database.

In one embodiment, before any instant message is released from the device onto the network, the message is parsed to obtain details on the message. These details may include one or more of the text of the message, the sender's name, recipient names, and others as described above. The IM detail database is then searched to see if there is a corresponding operation detail record in the database. If a record is found, it is presumed that the message was created by the user, is not harmful, and released onto the network for transmission to the recipients. If a record is not found, then it is presumed that the message was created by malware on the device and is blocked from further transmission. The message may be saved for analysis or deleted and the user of the device may be alerted that there may be malware, most likely an IM BOT, on the device.

In another embodiment, a method of preventing an instant message from infecting a computer device receiving the message includes searching the message when it is received for an embedded encrypted signal. If an encrypted signal or character is not found, the IM client software on the device does not open the message and may discard it and notify the user (recipient). If an encrypted signal is found and it can be decrypted, the message is opened and displayed by the IM client software. The encrypted signal is inserted into the instant message by the transmitting device when the IM software on the device determines that the message was created by a human being and not IM malware. The encrypted special signal may be inserted by a plug-in encryption module that operates in conjunction with the conventional IM client (software typically required when sending and receiving IMs). In another embodiment, an IM anti-malware software module may create and insert the special encrypted signal. In one embodiment, the IM software on the transmitting device determines that an IM was typed by a human being by using a feature of some IM client software (e.g., MNS Hotmail's Instant Messenger) that supplies the name of the sender/IM author automatically when an IM window is open and a message is being written. With this feature, when a message is created by an IM BOT, for example, no user name is supplied by the IM client software, and the IM anti-malware software (or encryption module plug-in) may presume that the message is not man made and will not insert the special signal.

Another embodiment is an IM-enabled device having a processor, a network interface component, and a memory component storing various types of data and software. In one embodiment, the memory stores an instant message (IM) window monitoring process module, an IM packet monitoring process module, and IM operation detail database containing IM operation data. In one embodiment, the IM window monitoring process module monitors activity occurring in an IM window using an activity logging module. The IM packet monitoring process module parses an outgoing IM message using an IM message parser to obtain specific IM operation data. The specific IM operation data is used to search the IM operation detail database.

BRIEF DESCRIPTION OF THE DRAWINGS

References are made to the accompanying drawings, which form a part of the description and in which are shown, by way of illustration, particular embodiments.

DETAILED DESCRIPTION OF THE INVENTION

Figure 1:
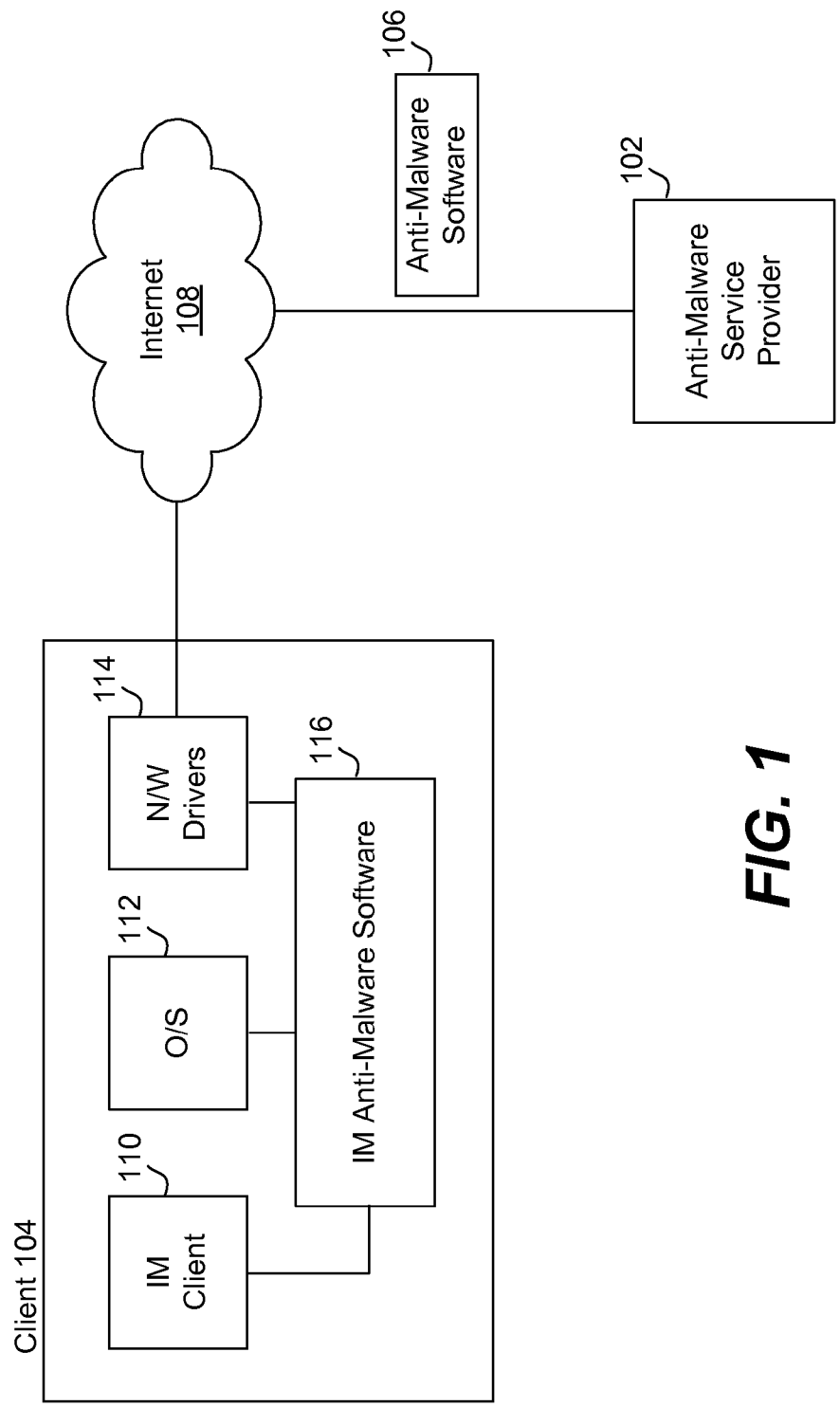
FIG. 1 is a network diagram of a client computer connected to a third-party software provider.

Methods and systems for detecting and preventing the transmission of instant messages created by malware, such as BOTS are described in the various figures. Instant messaging has gained popularity as a way of communicating in real time over the Internet and other types of networks (e.g., Intranets, VPNs, etc.) as an alternative to e-mail communication. Instant messaging allows two or more participants to have a more conversational type exchange of content whereby messages that are sent are typically received almost immediately and are often replied to right away, creating a real-time conversion using typed messages. Instant messages are typically short, forming more of a conversation than a correspondence, as is often the case with conventional e-mail. Instant messaging may be used in the same manner as e-mail, that is, for longer messages and need not be replied to right away, but the predominant use of IM is for more conversational type communication in an online environment. Messages are created in a visible chatting window (referred to here as an "IM window"). IM BOTS and other malware use windows that are not visible to the user or to the IM client software and are, in a sense, "invisible."

The software needed for IM is may be obtained by a user from an Internet Service Provider (ISP) or e-mail provider, such as Yahoo, MSN Hotmail, Gmail, and the like. In most cases, a user may simply download IM software on their won without interacting with an ISP or e-mail provider. Some examples of IM software are Trillian, ICQ, and other providers. However, the IM software often provides the integrated functionality of providing status feedback to a Web e-mail account registered by the user, another feature of IM software that users have often found useful. When a user opens an e-mail account with an ISP, they are often asked whether they would like to download the ISP's IM software (e.g., MSN's Windows Live Messenger) as well so that they can receive such IM messages. Sometimes referred to as an IM client, the software often works independent of a browser or operating system, and does not depend on the browser in order to execute. Some IM software may have integrated plug-ins for the browser, but generally it will work on its own without a browser. Typically with IM only other people who the user knows, often referred to as "Buddies", can send IMs to the user (thus preventing spammers from sending instant messages). However, as noted above, an instant message may come from a "Buddy's" computer, but not be typed or created by the known contact, but rather created by malware, an "IM BOT", that is, a message that was made by a software program and not by a user on the friend's computer.

In an alternative embodiment, a list of predefined known/famous IM software may be provided. The user can modify this list to add his or her favorite IM software if it is not on the list. If an IM message is sent from an IM client software that is not on the list, it may be presumed that the message is harmful and that the IM software is malicious. However, the invention described below addresses situations where the IM client software is on the known/famous list and that software is being used by IM malware to send out malicious instant messages to contacts or Buddies of the user. The present invention does not have to rely on identifying virus patterns or lists of known software.

FIG. 1 is a network diagram of a client computer connected to a third-party software provider. A service provider 102 may be a computer security software publisher, such as Trend Micro, Inc. of Cupertino, Calif. Service provider 102 creates software that prevents malware, BOTS, and other virus and unknown software from infiltrating computer and keeps infected computers from infecting others. With respect to the present invention, service provider 102 provides software that may be downloaded onto a client computer 104 so that the client does not send out instant messages that are not man-made, that is, typed by the computer's user, a human being operating client computer 104. By downloading this software, the user of the client computer is less likely to have his or her computer send potentially harmful instant messages to friends on the user's IM Buddy list.

Service provider 102 transmits at the request of client computer 104 an IM protection software package 106 over the Internet 108 or other suitable network. In other embodiments, software package 106 may be installed on client computer 104 via an appropriate medium, such as CD-ROM, USB memory device, and the like. In another embodiment, client computer 104 may have software package 106 installed when the user purchases or otherwise begins using the computer. In other embodiments, software package 106 may be transmitted wirelessly from an authorized source or transmitted by the Software as a Service (SaaS) platform.

Client computer 104 may have an instant message client module 110. As noted above, this software enables the user of client computer 104 to send and receive IMs to and from known individuals. IM client module 110 is generally not harmful to client 104 and typically provided to the user from the user's ISP or e-mail provider and is often a free service. IM client 110 operates independent of a browser and other software modules (not shown) on client computer 104. Also shown in client computer 104 are standard operating system software 112 and network drivers 114. Of course operating system software 112 will vary depending on the type of computer as does network driver software 114 which enables client 104 to communicate with other components on Internet 108, such as service provider 102 and other user computers (not shown).

An IM anti-malware software module 116 operates in conjunction with IM client module 110, operating system software 112, and drivers 114. In one embodiment, it is the same as software package 106 that is downloaded from service provider Web site 102. In other embodiments, IM anti-malware software module 116 may include other software or executable code from or related to IM client 110 or from other components in client computer 104 and may perform its monitoring operations from within IM client 110. In another embodiment, software module 116 attaches to or works in conjunction with operating system 112 rather than with IM client 110. It may also work more closely with network drivers 114, depending on the overall software configuration and on specific features of the client's network connectivity.

Figure 2:
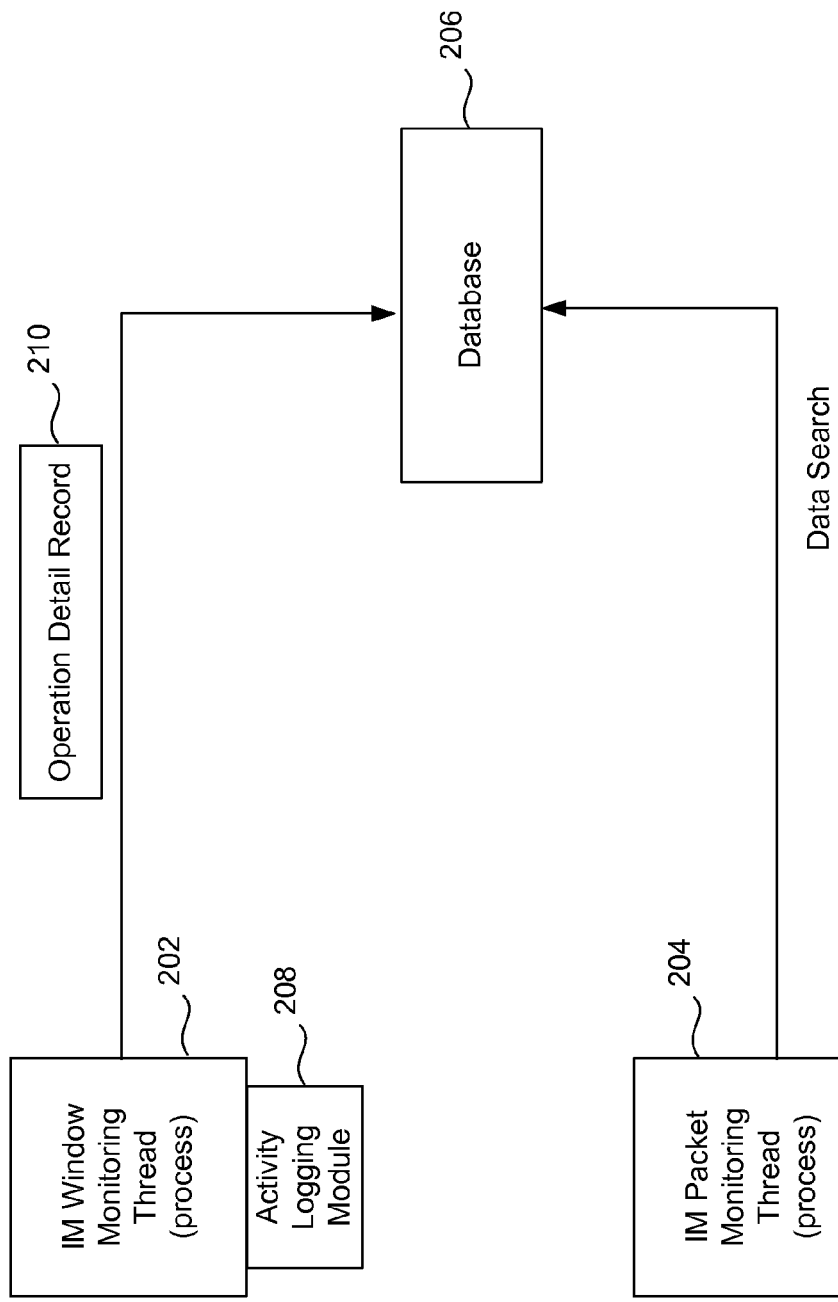
FIG. 2 is a block diagram of components and threads or processes in instant messaging (IM) anti-malware software module 116 in accordance with one embodiment of the present invention.

FIG. 2 is a block diagram of components and threads or processes in IM anti-malware software module 116 in accordance with one embodiment of the present invention. Shown are two operational threads: an IM windows monitoring thread 202 and an IM packet monitoring thread 204. In one embodiment, both are in communication with an IM message detail database or data storage area 206. Windows monitoring thread 202 executes in conjunction with an activity logging module 208. Windows monitoring thread 202 writes data 210 relating to IM messages to database 206. As described below in FIG. 3, operation detail data 210 is obtained from an IM window using activity logging module 208. IM packet monitoring thread 204 executes utilizing an IM message parser module 212. Once an IM message is parsed, the details of the message are searched for in database 206 to see if there is a match between the message or operation details obtained from parsing and any of the records in database 206 which may be a relational database, a hierarchical database, a flat file, a VSAN file, or any other appropriate format.

Figure 3:
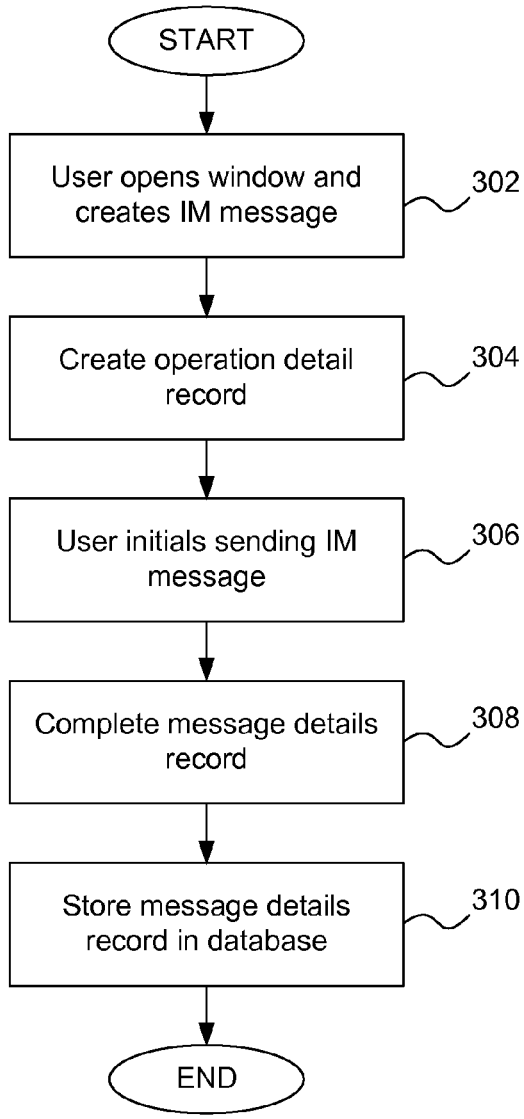
FIG. 3 is a flow diagram of a process of monitoring the creation of an IM message and storing of message details in a database.

FIG. 3 is a flow diagram of a process of monitoring the creation of an IM message and storing of message details in database 206. In one embodiment, some or all of the steps occur during execution of IM windows monitoring thread 202 and utilize activity logging module 208. The process may begin at step 302 with a user typing the text of an instant message in an IM window on client computer 104. An IM window typically appears when a user activates or clicks on an IM icon in an e-mail program (e.g., Yahoo Instant Messenger) or from outside an e-mail program. A list of "Buddies" or authorized recipients/senders may appear with the window so that the user can pick one or more recipients he wants to send the message to. At step 302 the user may select a friend (recipient) of the message and then begin typing a message or may select recipient(s) after typing the message.

At step 304 details of the IM message being typed are stored in a database record or other suitable format. In one embodiment, an empty record is created concurrently with the window opening and before the user begins typing any content into the message. In another embodiment, a VSAM file or flat file is created once the window is opened or there is some indication from IM client module 110 that a new message is about to be written. For example, once the recipient name is selected, that name and an e-mail address are stored in a record concurrently. Once the user begins typing a message, for example, "Hi, what are you doing for lunch?" in one embodiment, each character comprising the text of this message is being typed, is stored in a record or data file. In some cases, the user (sender) may want to attach a file, such as a photo or document. This operation may also be recorded and may include details such as the name of the file, its location, size, type, and other properties. Other operations may also be possible with IM and such operations may be recorded in database 206. In one embodiment, only details on the text and any attachments may be recorded in database 206, described in further detail in FIG. 5.

Activity logging module 208 is utilized by thread 202 to log or monitor some or all of the operations being performed by the user in creating the IM. For example, while recording the text of the message as it is being typed, a key logger type program may be used to track the keystrokes of the user or a software module that duplicates what is being typed by the user into the IM window may be used to duplicate the content into the database record, referred to herein as an operation detail record. Thus, at the end of step 304, in one embodiment an operation detail record is partially populated with content.

At step 306 the user sends the IM to the one or more recipients. It is important to note that when a user clicks on the "Send" icon or virtual button or hits the Enter key in the IM window, an IM message transmission process is initiated and that there are normally additional "behind-the-scenes" operations that may occur in IM client 110 and in other components of client computer 104, such as in operating system 112 and network drivers 114. In one embodiment, one of the operations that occurs is the sealing or completion of the operation detail record at step 308 before being stored in database 206. Other information that may be included in an operation detail record is the timestamp of when the user initiates sending the IM message (i.e., hits the SEND button on the screen). In other embodiments there may be additional information or fewer data items in the operation detail record. In the described embodiment, an operation detail record may include the text of the actual IM message, name, metadata on attached files, IM message type, sender name, receiver(s) name, and timestamp. Examples of message types includes text-based message or an invitation request (e.g., for gaming, live chat, sharing files, etc.).

At step 310 operation detail record 210 is saved in database 206. In one embodiment, the data relating to the IM message is saved as it is created by the user or IM client 110, thereby eliminating the need to store the record in database 206 as a separate step. Regardless of the specific implementation of how operation detail data 210 is saved in database 206, a specific data record is created and stored in the database that contains data relating to a specific "man-made" IM message being typed the user (i.e., a human being) operating client computer 104. Once the record is saved and stored in database 206, the process of monitoring the creation of one IM message in an IM window is complete. It may also be noted that there may be more than one IM window on client computer 104 that the user is using to create IM messages. For example, a user may have the MSN Windows Live Messenger IM window open as well as a Yahoo IM window, along with others. IM window monitoring thread 202 may monitor multiple IM windows and record operation details for more than one IM message being created in multiple IM windows. Although it is unlikely that a user will be able to type two or more IM messages at the same time, it is possible that IM malware on client computer 104 is creating an IM message at the same time the user is creating a legitimate IM message. In one embodiment, window monitoring thread 202 detects and records only IM messages that are typed by a human being in an IM window. The window monitoring thread may monitor any text being typed into an active IM window and compares that text with all outbound traffic via the IM client, as described above. If a BOT attempts to inject an IM message that was not created by a human, it must do this by not using an active IM window.

Figure 4:
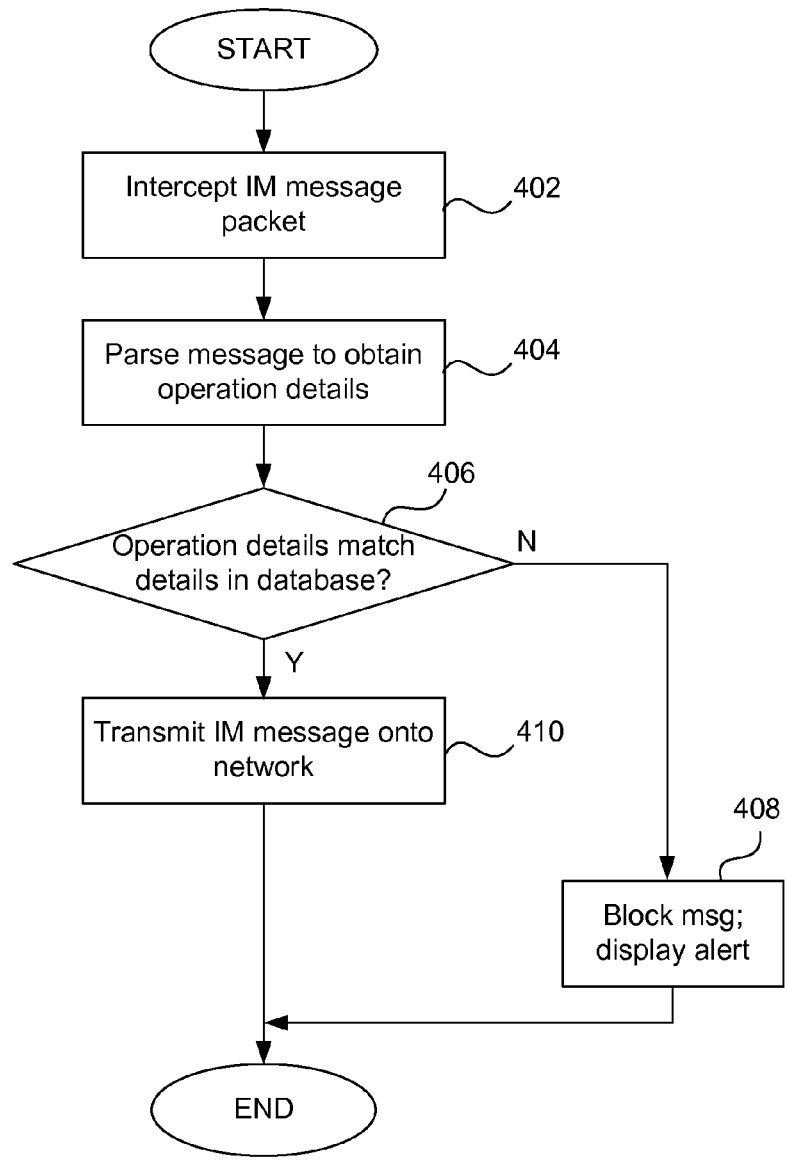
FIG. 4 is a flow diagram of a process of IM message packet monitoring in accordance with one embodiment of the present invention.

FIG. 4 is a flow diagram of a process of IM message packet monitoring in accordance with one embodiment of the present invention. At step 402 IM packet monitoring thread 204 intercepts all IM messages that are being sent from client computer 104 onto the network, such as Internet 108. In one embodiment, thread 204 is able to detect and intercept IM messages being sent from any of the IM clients on client computer 104. This may be implemented by having packet monitoring thread 204 operate in conjunction with IM client software 110 and network drivers 114. As is known in the art, data being transmitted from client 104 onto network 108 may be controlled by network drivers 114 (which essentially controls all communications by client computer 104 with the network). All IM messages, regardless of whether they were created in an IM window or not, may be intercepted by packet monitoring thread 204.

At step 404 the intercepted message is parsed by message parsing module 212 to obtain some of the operation details of the message. This may be done since most IM client connections are not encrypted, thus allowing the extraction of information from the message. Message parser 212 may be a conventional text parser or may be a specialized or custom-designed parser specifically made for efficiently parsing IM message formats. At step 404 text of the message may be parsed or separated from the rest of the message packets and the name and other metadata of any attachments may also be obtained. The other data items described above, such as receiver names and a timestamp may also be obtained from parsing operations at step 404.

At step 406 some or all of the operation details obtained at step 404 are used to search database 206. For example, the timestamp which indicates the time at which a message was sent measured up to seconds is likely to be a unique value may be a good value to use to search database 206. In another embodiment, the text of the message may be used to perform the search. The primary purpose of performing the search is to determine whether the message being transmitted from client computer 104 onto the network to one or more recipients was created by the user and not by an IM BOT or other IM message malware on client 104. As described above, if a message was created by a human being in one of the IM windows, operation details of the message are stored in database 206.

If at step 406 it is determined that the operation details of the IM message are not in the database, at step 408 the IM message is blocked and an appropriate message may be displayed to the user stating that an IM message potentially containing harmful URLs or other content and that was not created by the user was blocked from being transmitted from the user's computer to the user's contact. It may also advise the user to check whether there is any IM BOTs or malware on the user's computer. Software for doing so may also be available from Trend Micro, Inc. of Cupertino, Calif. In this manner, unauthorized and potentially harmful IM messages are prevented from being released onto the network and potentially infecting other computers, hand-held device, handsets, mobile phones, and so on.

If the search at step 406 results in a match between the operation detail data and the stored data in database 206, IM packet monitoring thread 204 permits the IM message to be transmitted from client computer 104. Thus, if a match is found at step 406, it can be assumed that the IM message being sent was created by the user of the computer in an IM window and was not created by an IM BOT or similar malware. Thus, a SEND initiated by a user at step 306 in FIG. 3 may conclude with step 406 and steps 408 or 410. The latency between the time the operation detail record is finalized or sealed and saved at step 308 and the time at which the search performed at step 406 may be one or two seconds, or shorter. The time to intercept the IM message at step 402 and parse it at step 404 will take a certain number of CPU clock cycles and by the time the search is performed at step 406, the IM operation detail record will have been saved in database 206 for a sufficient amount of time, e.g., one to two seconds. If there is a match at step 406 and the IM message is released onto the network, the operation detail record may be deleted from database 206. In this manner, the size of database 206 can be kept relatively small and, thus, efficiently searched.

Figure 5:
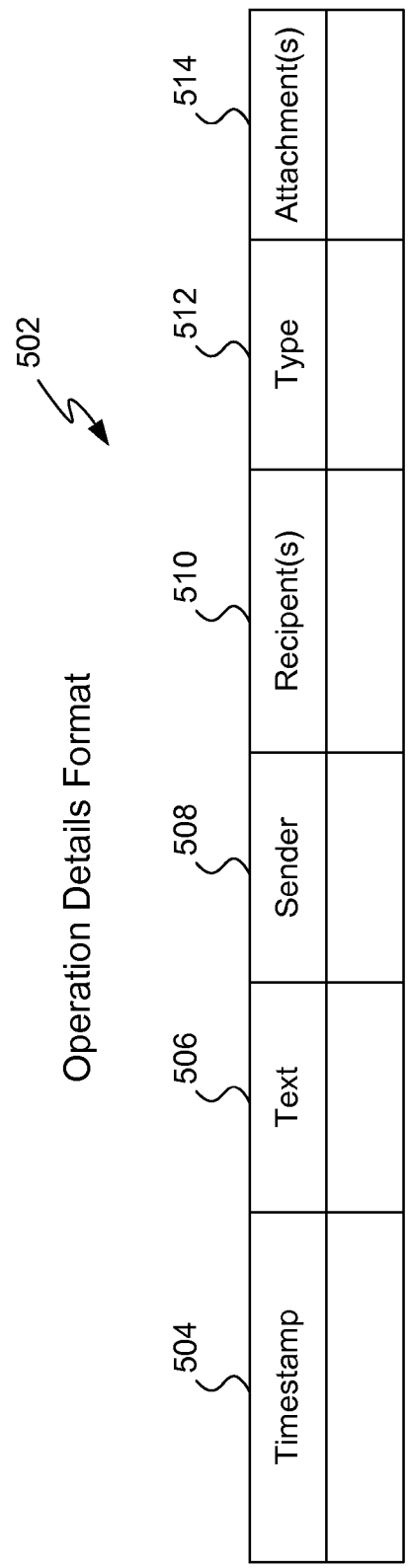
FIG. 5 is a data format diagram of an operation details record in accordance with one embodiment of the present invention.

FIG. 5 is a data format diagram of an operation details record in accordance with one embodiment of the present invention. As noted above, an operation details data packet 210 may contain various types of data characterizing the IM message being sent by the user. In one embodiment, a record 502 may include a timestamp field 504 which stores the date and time an IM message is completed by the user (sender) and a send operation has been initiated. A text field 506 stores the actual text contained in the IM message being sent. In one embodiment, the entire text of the message may be stored. In other embodiments, only a portion of the text is stored (e.g., the first 25 characters). As described above, the text is to the actual text being transmitted by the user. Field 508 stores the name or a unique identifier of the user or sender of the message. In most cases where the user is the only person typically using the computer, the sender name will likely be the same. If the computer is shared, the name in sender field 508 may be different. Receiver field 510 stores the names or unique identifiers of the one or more recipients of the IM message. In most cases these names will be taken from the user's "Buddy" list or equivalent which contains the e-mail addresses of authorized recipients or frequently used e-mail addresses and is meant to be a convenience for the sender. Another field is message type 512 which stores data indicating the various types of IM messages that may be sent. Another field that may be used is attachment field 514 which contains data on attached files that may be sent with the IM message, such as documents or photos. In one embodiment, this may include the name of the file, file extension (e.g., .jpg, .pdf, .wav, .ftp and so on) and may also include data on the size of the file, along with other data.

In another embodiment of the present invention, an IM message sent from a client computer is modified by having a special encrypted signal inserted into the message when it is being sent by a human being. When the message is received, the client computer checks for the special encrypted signal and decrypts the signal before the IM message is displayed to the user. In this manner, IM messages created by BOTS or other malware on the sender's computer are not displayed on the receiver's computer because the special encrypted signal was not inserted into the message at the sender computer and, thus, when the message is received, the client computer is unable to find the encrypted signal and instead may display an appropriate message on the monitor, may simply discard the IM message without informing the recipient, or may delete any potentially harmful URLs, links, attachments, and the like. The receiving computer may not have any malware or IM BOTS residing on it. However, it may receive IM message created by such malware and when it does, the recipient may not want to see the message or even know that it was received.

Figure 6:
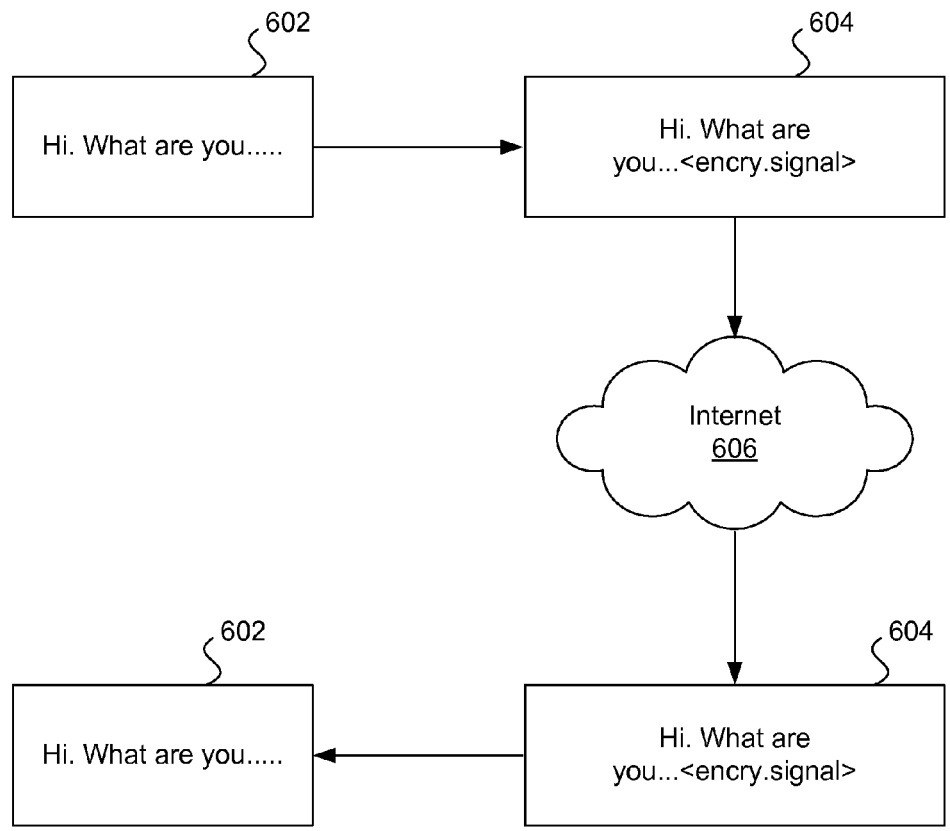
FIG. 6 is a network diagram showing the various stages an IM message may go through from a sender to a receiver in accordance with one embodiment.

FIG. 6 is a network diagram showing the various stages an IM message may go through from a sender to a receiver in accordance with one embodiment. A message 602 is typed by a human being. Once it is determined that the IM message is being created by a human, a special encrypted signal is inserted into the message thereby modifying message 602 to message 604. Message 604 is then sent to recipient via Internet 606 or other suitable network. Message 604 which contain the special encrypted character is decrypted and removed to obtain original message 602. If a message is not typed by a human being, a special encrypted signal is not inserted into the message. At the receiver's end, if the system does not find the special signal, it knows that the IM message may have been created by a BOT or other malware and, in one embodiment of will not display it to the receiver.

Figure 7:
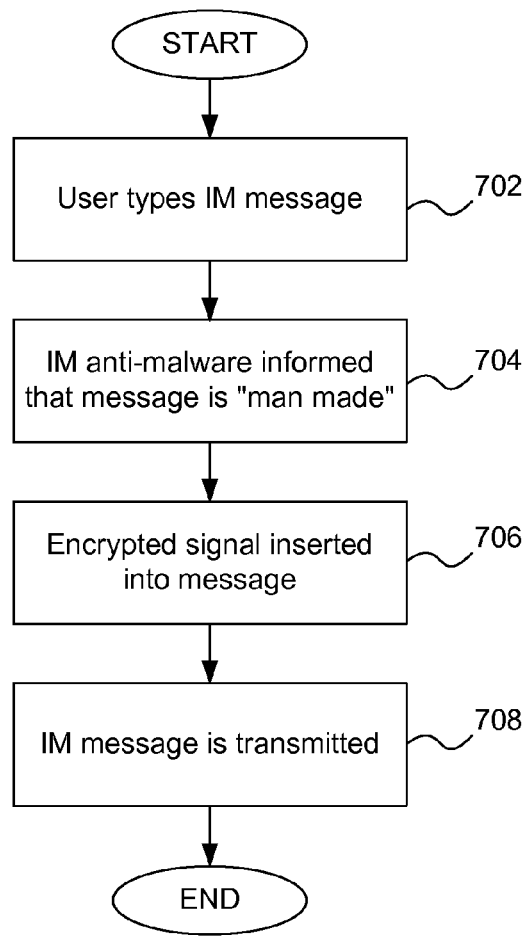
FIG. 7 is a flow diagram of a process of creating an instant message with a special encrypted character in accordance with one embodiment.

FIG. 7 is a flow diagram of a process of creating an instant message with a special encrypted character in accordance with one embodiment. The method described in FIG. 7 is in the context of a browser or IM client that is capable of providing the name of the user typing the message in the IM window. For example, this feature is available with the MSN/Hotmail IM client. At step 702 the user types an IM message in an IM window where the name of the user/sender appears in the window, for example, at the bottom of the window or in the "From:" field. At step 704 the fact that an IM message is being sent from a person is transmitted to the IM anti-malware software from the IM client. This message (not the IM message) is an informational or status message that is being transmitted and in one embodiment does not include the sender's name. The anti-malware software knows that the person writing the IM message is a human being because of this message. At step 706 the IM anti-malware software inserts an encrypted special signal or character into the IM message. In one embodiment the software component that generates this signal and inserts it into to the IM message is an encryption module that operates with the IM anti-malware program. In another embodiment the encryption module is an IM plug-in module. In another embodiment the encrypted special signal is inserted at a specific location in the message, such as at the end or beginning of the message. Once the special character is inserted, at step 708 the message is transmitted to the recipient's computer. If the IM-anti-malware software is not informed by the IM client of a name, it will not create a special encrypted signal for insertion into the IM message. It may only insert the special signal when it is certain that the IM message is "man made" and not created by a BOT or other IM malware.

Figure 8:
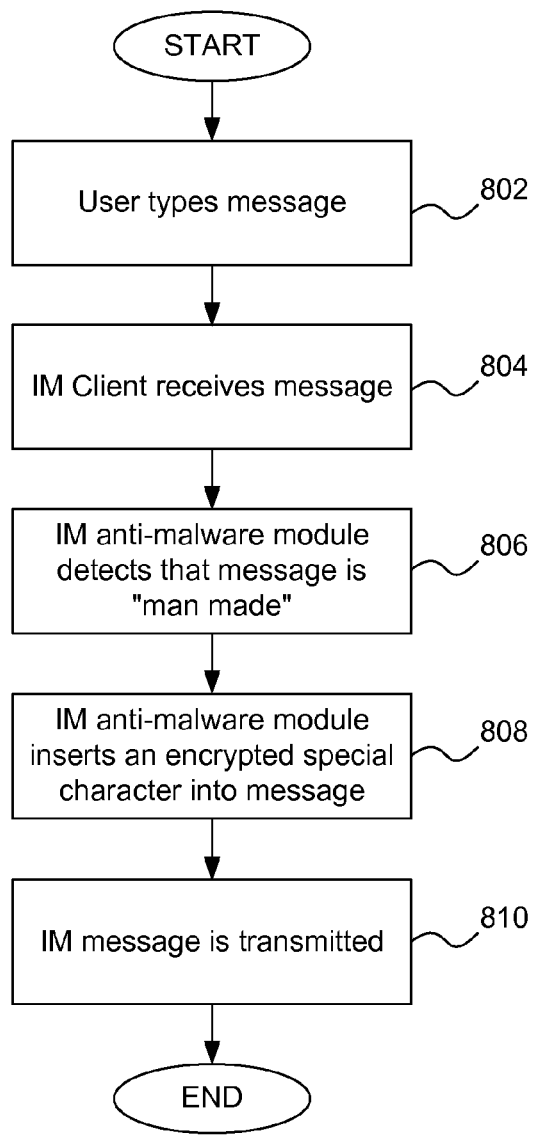
FIG. 8 is a flow diagram of a process of creating an IM message with a special encrypted signal in accordance with one embodiment.

FIG. 8 is a flow diagram of a process of creating an IM message with a special encrypted signal in the context of an IM client that is not capable of providing the IM anti-malware software with data relating to the creation of the message, specifically whether the message is being created by an actual user by providing a name. At step 802 the user types an IM message as in step 702. At step 804 the IM client receives the message. At step 806 the IM anti-malware software detects that the message is created by a human being or an actual user. For example, it may detect that the IM message is being typed from a keyboard using a tool similar to a key logger. In another embodiment, the anti-malware software can track whether the IM window of the IM client was actually in use or active immediately (or close in time to) before the IM message transmission time. In another embodiment, the IM client or anti-malware software may require the user to register a certain tag, nickname, or any text string that can be used to identify the user (it may be changed periodically) to the IM anti-malware software. When the user types in the message in an IM window and the anti-malware software knows that the user, in fact, typed the message, it may append this tag to the message and record this information in a database. If the IM message was not made by a human being, the IM message will not have this tag or string appended and will be detected by the IM anti-malware software. Other techniques that may be used to determine that a human is typing a message is by monitoring system keyboard activity or having an IM share its plug-in for monitoring system activity. At step 808 the IM anti-malware software inserts an encrypted special signal into the IM message as described in step 706. In one embodiment, the encryption module that creates the signal is implemented as a plug-in module. At step 810 the IM message with the encrypted signal is transmitted to the recipient's computer over the network.

Figure 9:
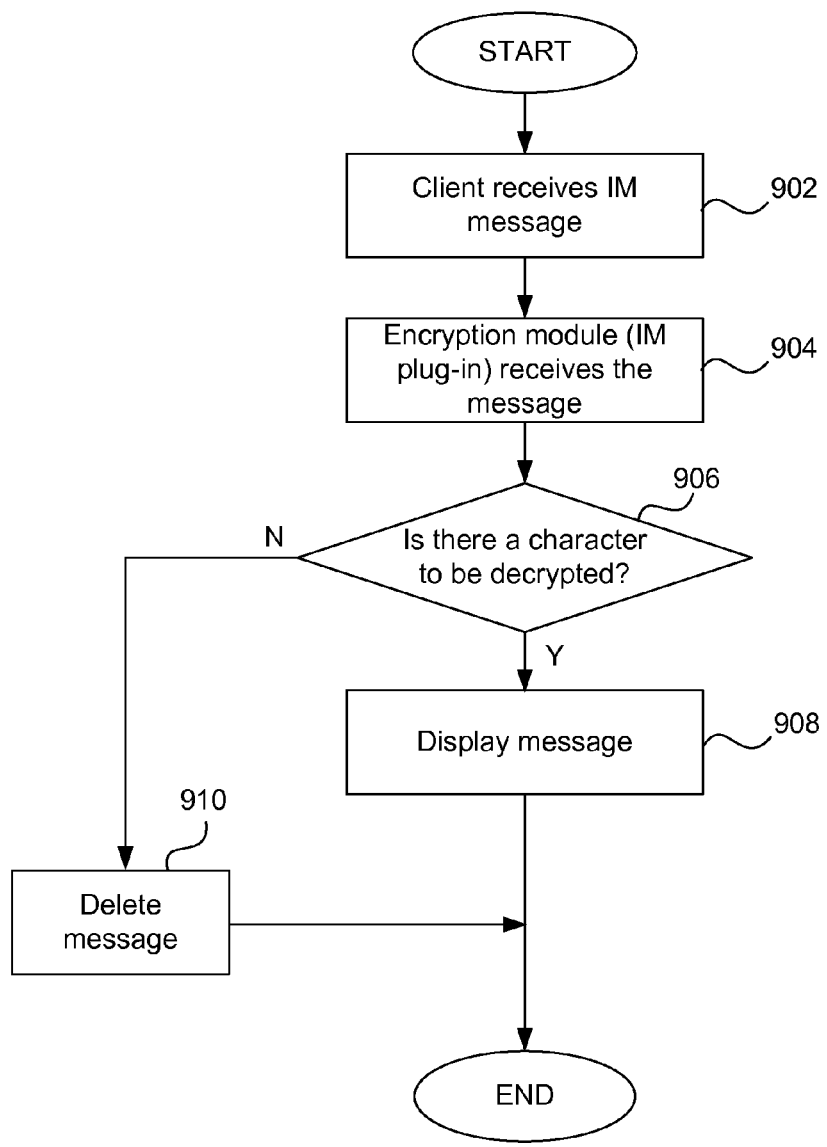
FIG. 9 is a flow diagram of a process of the recipient's computer receiving an IM message with a special encrypted signal contained in the IM message.

FIG. 9 is a flow diagram of a process of the recipient's computer receiving an IM message with a special encrypted signal contained in the IM message. At step 902 the client computer receives the IM message that was transmitted at step 708 or at step 810. At step 904 an encryption module or IM plug-in receives the message. As described above, this module or plug-in may be part of the IM anti-malware software. At step 906 the encryption module determines whether it can decrypt the special signal. If it can, at step 908 the recipient's computer knows that the IM message was created by a human being and not by a BOT or other malware residing at the transmitting computer and displays the message.

Figure 10:
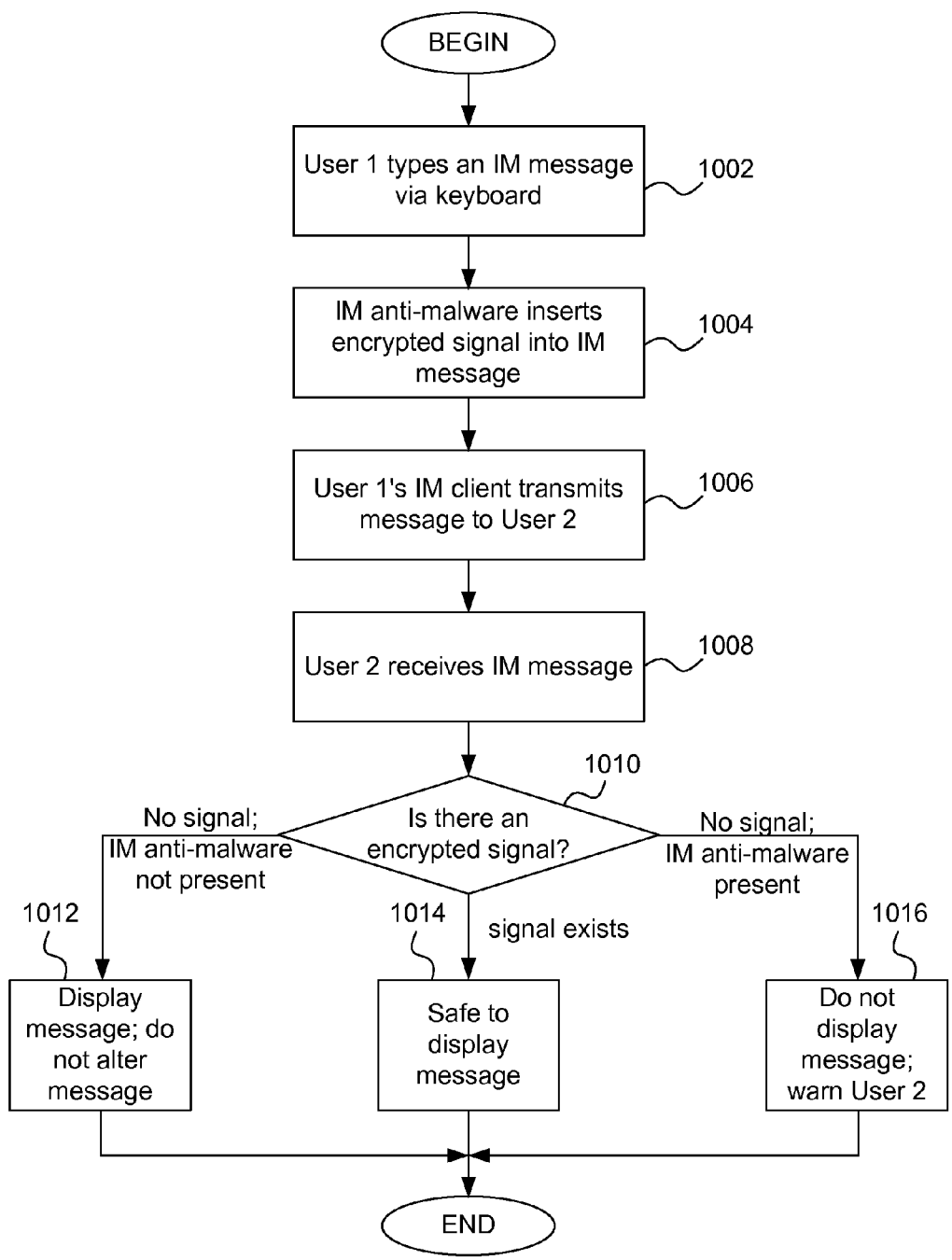
FIG. 10 is a flow diagram of a process of detecting whether an IM message is potentially malicious and three different scenarios depending on whether a secret code is embedded in the IM message.

FIG. 10 is a flow diagram of a process of detecting whether an IM message is potentially malicious and three different scenarios depending on whether a secret code is embedded in the IM message. The process shows and describes some of the steps already described but in a different context. At step 1002 User A inputs or types an IM message via a keyboard or keypad (for example, from a handset, cell phone, and the like). In other embodiments, User A may use a voice recognition program to speak the message which is "typed" into an IM message window. At step 1004 an IM plug-in inserts an encrypted secret text or signal, such as "Message typed by User A" or some other secret text into the IM message. At step 1006 User A's IM client software transmits the IM message to the target of the message, i.e., the receiver's computing device (e.g. User B). At step 1008 User B receives the IM message from User A and the IM client software on User B's computing device examines the message to determine if the secret text or signal is embedded in the IM message.

At step 1010 it is determined which of three different actions should be taken depending on whether the secret text is embedded. In one case, the secret code is not embedded in the IM message text and is being sent by an IM client (on the sender's computer) that does not have the IM anti-malware software, and thus will not have an embedded secret text in it. In this case nothing is done to the IM message and it is displayed on the computer at step 1012. When the IM client has the anti-malware plug-in software and the plug-in is enabled or is working, a standard non-secret message is inserted into the message, for example, "<SPAM_FREE>" or some other text that indicates that the IM plug-in is operating. In another case, it is determined that there is an embedded secret text in the IM message. In this case, the IM message was sent by an anti-malware protected IM client on User A's computer (the message also contains the standard text, e.g., <SPAM_FREE>, as indicated above. Because the IM message has a secret text or signal embedded in it, it has been determined to be typed by a human (i.e., User A) and is safe.

At step 1014 the IM message is displayed to User B without the embedded secret text. In another case, the IM message is sent by an IM client that has the anti-malware software but the message does not have the secret embedded text and thus is identified as not being sent by a human being but by a malicious software program on User A's computer. In this, at step 1016, the IM message is blocked, User B is warned, or any URLs in the message are removed and then displayed (maybe with a warning message). There are various possibilities of what may be done if it is determined that the IM message was not sent by a human being. Thus, FIG. 10 shows three different scenarios or cases of User B receiving an IM message: 1) the IM message was sent by an IM client that does not have the plug-in or IM anti-malware software, 2) the IM message was sent by an IM client that does have the plug-in and it is determined that the message is created by a human, and 3) the IM message was sent by an IM client that does have the plug-in or anti-malware software and it is determined that the message is not created by a human being.

Figure 11A:
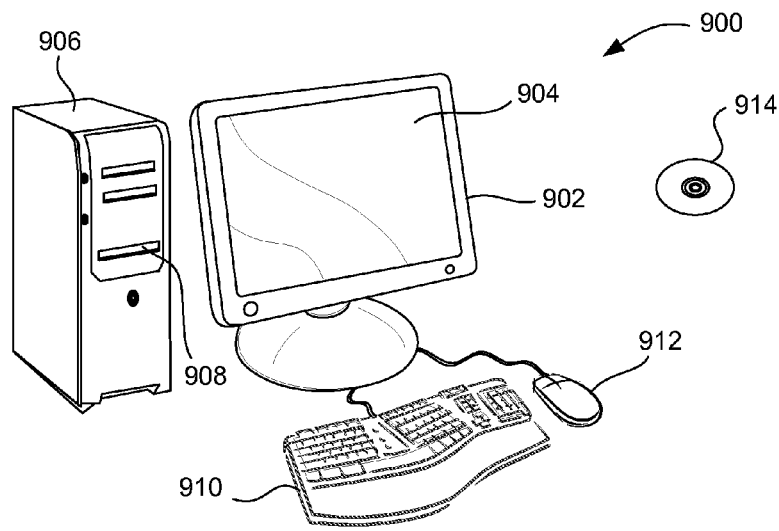
FIGS. 11A and 11B illustrate a computer system suitable for implementing embodiments of the present invention
Figure 11B:
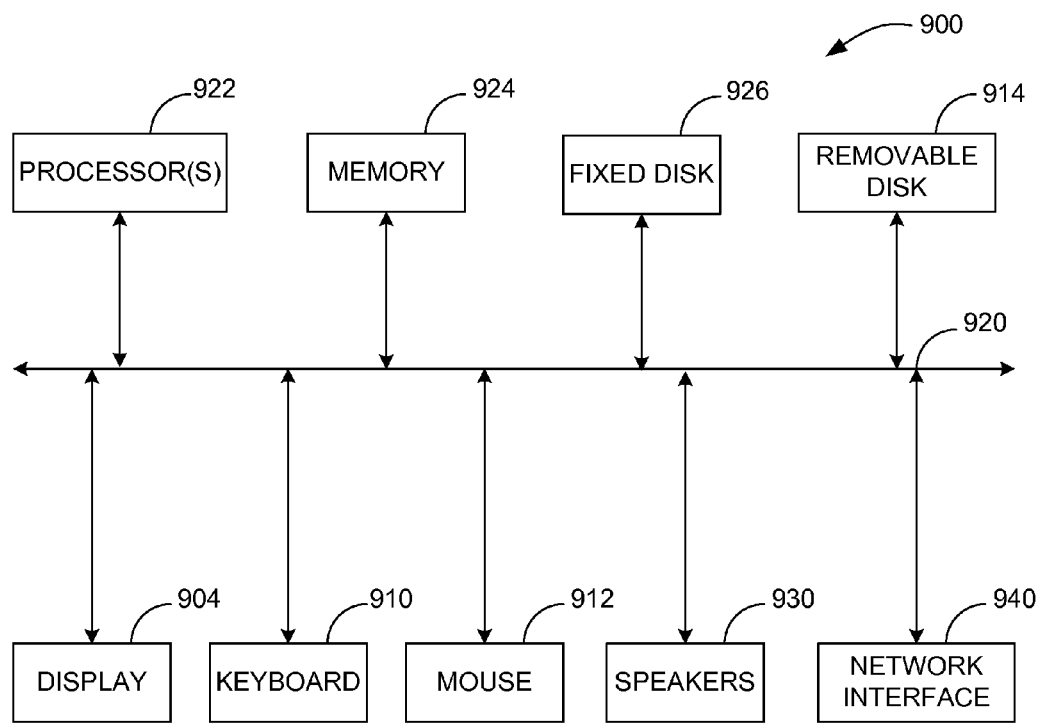

FIGS. 11A and 11B illustrate a computer system 1100 suitable for implementing embodiments of the present invention. FIG. 11A shows one possible physical form of the computer system. Of course, the computer system may have many physical forms including an integrated circuit, a printed circuit board, a small handheld device (such as a mobile telephone, handset or PDA), a personal computer or a super computer. Computer system 1100 includes a monitor 1102, a display 1104, a housing 1106, a disk drive 1108, a keyboard 1110 and a mouse 1112. Disk 1114 is a computer-readable medium used to transfer data to and from computer system 1100.

FIG. 11B is an example of a block diagram for computer system 1100. Attached to system bus 1120 are a wide variety of subsystems. Processor(s) 1122 (also referred to as central processing units, or CPUs) are coupled to storage devices including memory 1124. Memory 1124 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 1126 is also coupled bi-directionally to CPU 1122; it provides additional data storage capacity and may also include any of the computer-readable media described below. Fixed disk 1126 may be used to store programs, data and the like and is typically a secondary storage medium (such as a hard disk) that is slower than primary storage. It will be appreciated that the information retained within fixed disk 1126, may, in appropriate cases, be incorporated in standard fashion as virtual memory in memory 1124. Removable disk 1114 may take the form of any of the computer-readable media described below.

CPU 1122 is also coupled to a variety of input/output devices such as display 1104, keyboard 1110, mouse 1112 and speakers 1130. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 1122 optionally may be coupled to another computer or telecommunications network using network interface 1140. With such a network interface, it is contemplated that the CPU might receive information from the network, or might output information to the network in the course of performing the above-described method steps. Furthermore, method embodiments of the present invention may execute solely upon CPU 1122 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For example, although the embodiments are described using BOTS, other types of malware such as WORMs may also create harmful and unintended instant messages. Accordingly, the embodiments described are illustrative and not restrictive, and the invention is not to be limited to the details given herein, but may be modified within the scope and equivalents of the appended claims.

We claim:

1. A method of preventing transmission of malware-created instant messages comprising:
   detecting that an active instant messaging (IM) window, specifically for entering text, has been opened on a computing device;
   detecting a first text being typed into the active IM window by a human being using a keyboard;
   copying the first text or a first timestamp associated with said first text into a data storage area on said computing device, said data storage area including a stored text or a stored timestamp of all instant messages typed into an active IM window on said computing device;
   intercepting an IM packet before the IM packet is transmitted from the computing device onto a network;
   parsing the IM packet to obtain a second text or a second timestamp;
   determining whether the second text or the second timestamp matches respectively with a text or a timestamp stored in the data storage area; and
   blocking transmission of the IM packet from said computing device when the second text is determined not to match or when the second timestamp is determined not to match.

2. A method as recited in claim 1 wherein the data storage area is an IM operation detail database having one or more IM operation detail records.

3. A method as recited in claim 2 wherein the copying step further comprises storing the first text in an IM text field of an IM operation detail record.

4. A method as recited in claim 1 further comprising:
allowing transmission of the IM packet when the second text and the first text are determined to match or when the second timestamp and the first timestamp are determined to match.

5. The method as recited in claim 1 further comprising:
storing a property of the first text in the data storage area, wherein the property is a timestamp, metadata of an attached file, an IM type, or sender name;
parsing the IM packet to obtain a property of the second text;
determining whether the property of the second text matches the property of the first text stored in the data storage area; and
blocking transmission of the IM packet when the property of the second text and the property of the first text are determined not to match.

6. A method as recited in claim 1 wherein said data storage area does not include information regarding instant messages that have not been typed into an active IM window on said computing device.

7. A method of preventing a message of instant messaging (IM) from infecting a computing device, the method comprising:
receiving the message at the computing device from a transmitting device;
determining whether the message includes non-secret text indicating that the transmitting device includes an IM anti-malware software;
determining whether the message includes an embedded encrypted secret code wherein the encrypted secret code is generated at the transmitting device by an encryption software of the IM anti-malware software;
preventing the message from being opened on the computing device when the transmitting device is determined to include the IM anti-malware software and when the encrypted secret code is determined to be not found in the message,
wherein the encrypted secret code is embedded into the message at the transmitting device if the transmitting device determines that a human being created the message, such that the encrypted secret code is transmitted, in the message, from the IM anti-malware software in the transmitting device to the computing device.

8. A method as recited in claim 7 wherein the transmitting device determines whether a human being created the message by determining whether an IM window on the transmitting device was active immediately before the message was transmitted.

9. A method as recited in claim 7 wherein an IM sender name appears in an IM window displayed on the transmitting device and wherein the IM anti-malware software on the transmitting device determines that the message was created by a human being when the IM sender name is provided to the IM anti-malware software on the transmitting device by an IM client on the transmitting device to indicate that the message was created by a human being.

10. The method as recited in claim 7 wherein the transmitting device determines whether a human being created the message by detecting whether the message is being typed on a keyboard of said transmitting device.

11. The method as recited in claim 7 wherein the encrypted secret code is not embedded into the message when the transmitting device determines that a human being did not create the message.

12. A method of preventing a message of instant messaging (IM) from infecting a computing device, the method comprising:
inserting a non-secret text in the message indicating a presence of an IM anti-malware software on a transmitting device;
determining whether a human being created the message on the transmitting device;
embedding an encrypted secret code in the message when it is determined that the human being created the message, wherein the encrypted secret code is generated by an encryption software of the IM anti-malware software; and
transmitting the message from the transmitting device to the computing device, wherein the computing device can determine that the message was not created by the human being when the non-secret text is found in the message and the encrypted secret code is not found in the message.

13. The method as recited in claim 12 wherein the determining step comprises:
determining whether a human being created the message by determining whether an IM window on the transmitting device was active immediately before the message is to be transmitted.

14. The method as recited in claim 12 wherein the determining step comprises:
receiving a message from an IM client on the transmitting device indicating that the message was created by a human being.

15. The method as recited in claim 12 further comprising:
determining whether a human being created the message by determining whether the message is being typed on a keyboard of said computing device.

16. The method as recited in claim 12 further comprising:
not embedding said encrypted secret code when it is determined that the human being did not create the message.

17. A method of preventing transmission of malware-created instant messages comprising:
detecting that an active instant messaging (IM) window, specifically for entering text, has been opened on a computing device;
detecting a first text being typed into the active IM window by a human being using a keyboard;
copying the first text or a first timestamp associated with said first text into a data storage area on said computing device, said data storage area including a stored text or a stored timestamp of all instant messages typed into an active IM window on said computing device;
intercepting an IM packet before the IM packet is transmitted from the computing device onto a network;
parsing the IM packet to obtain a second text or a second timestamp;
determining whether the second text or the second timestamp matches respectively with the first text or the first timestamp stored in the data storage area; and
allowing transmission of the IM packet from the computing device when the second text and the first text are determined to match or when the second timestamp and the first timestamp are determined to match.

18. A method as recited in claim 17 wherein said data storage area does not include information regarding instant messages that have not been typed into an active IM window on said computing device.

19. A method as recited in claim 17 further comprising:
- blocking transmission of the IM packet from said computing device when the second text is determined not to match or when the second timestamp is determined not to match.

* * * * *